Dec. 9, 1969 R. D. HUNTER ET AL 3,483,519

RELOCATABLE ACCUMULATOR IN A DATA PROCESSING SYSTEM

Filed April 15, 1965

DATA PROCESSING SYSTEM

INVENTORS.
ROBERT D. HUNTER
DAVID E. KEEFER
JOHN E. WILHITE
BY [signature]
ATTORNEY United States Patent Office
3,483,519
Patented Dec. 9, 1969

3,483,519

RELOCATABLE ACCUMULATOR IN A DATA PROCESSING SYSTEM

Robert D. Hunter, Wayland, Mass., and David E. Keefer, Scottsdale, and John E. Wilhite, Phoenix, Ariz., assignors to General Electric Company, a corporation of New York Filed Apr. 15, 1965, Ser. No. 448,540
Int. Cl. G11b *13/00;* G06f *1/00, 7/00*
U.S. Cl. 340—172.5 6 Claims

ABSTRACT OF THE DISCLOSURE

Adjacent word locations in memory are reseved for use as the accumulator of a data processing system arithmetic unit, and the accumulator location may be relocated in memory by changing the address of words stored therein.

This invention relates to data processing systems and, in particular, to arithmetic units for use in data processing systems.

An arithmetic unit of a data processing system normally has as one of its components a storage unit called the accumulator. The accumulator of the arithmetic unit is normally employed to store the result of an arithmetic operation in the adder, which is another component of the arithmetic unit. The accumulator is also employed to temporarily store operand words which are to be processed in an arithmetic operation performed by the arithmetic unit, or which are to be processed by another type of operation in the data processing system. The accumulator may also serve to store the result of a data processing operation other than an arithmetic operation performed by the arithmetic unit. Thus, execution of an instruction by the data processing system may modify or employ the contents of the accumulator.

Some prior art data processing systems provide an accumulator in memory by reserving one or more predetermined fixed memory locations for use as the accumulator. In employing the accumulator during instruction execution to process data, the contents of the accumulator often must be replaced by new information, while preserving the previous accumulator contents. This requires that the present contents of the accumulator be read from memory and stored in a new memory location and that the new information also be read from memory and stored in the accumulator memory location. This nonproductive movement of information in the memory requires a large number of memory cycles, i.e. time periods required to read information from or to store information into memory, and is wasteful of data processing time.

Other prior art data processing systems employ a register or registers outside the memory as the accumulator of the arithmetic unit. The use of an accumulator register external to the memory also requires a large number of non-productive memory cycles in storing information from the accumulator and replacing it with new information which is to be employed in executing a given instruction. In addition, the contents of such an accumulator register cannot be explicitly addressed by an instruction word. Accordingly, it is desirable to provide an accumulator in a data processing system which permits more effective utilization of data processing time and which eliminates unnecessary data transfers during instruction execution.

It is therefore an object of this invention to provide an improved arithmetic unit in a data processing system.

It is another object of the invention to provide an improved accumulator arrangement in the arithmetic unit of a data processing system.

It is another object of the invention to provide an accumulator arrangement in an arithmetic unit which reduces the processing time for data processing operations employing the accumulator.

It is a further object of the invention to provide an accumulator arrangement in an arithmetic unit which reduces the number of data transfers necessary to perform data processing operations employing the accumulator.

It is a further object of the invention to provide apparatus in the arithmetic unit of the data processing system which reduces the number of memory locations required to store a program for performing a particular data processing operation.

The foregoing objects are achieved, in the illustrated embodiment of the invention, by reserving four adjacent word locations in memory for use as the accumulator of the data processing system arithmetic unit. The four adjacent memory word locations comprising the accumulator are not fixed and the accumulator may be moved to any group of four adjacent word locations in memory. Relocating the accumulator in memory does not change the contents of either the previously designated or newly designated group off our memory word locations. The address of the most-significant memory word location of the accumulator is chosen to be evenly divisible by four and this address is stored in the A-Register of the program processor. The remaining accumulator word locations in memory, in the order of decreasing significance, are assigned memory word locations having successively higher addresses. The accumulator arrangement of the invention permits, through control of the address in the A-Register, movement of the accumulator to the data to be processed during execution of instructions by the data processing system, saving processing time and memory locations.

This specifiation and accompanying drawings disclose inventive subject matter invented by the following: Thomas J. Beatson, Richard A. Boennighausen, Frank J. Boyle, Byron F. Burch, Jr., Edwin W. Herron, Robert D. Hunter, David E. Keefer, Robert A. Perrine, Richard M. Rojko, Daniel W. Scott, John E. Wilhite.

DESCRIPTION OF DRAWINGS

The subject matter of the invention is particularly pointed out and distinctly claimed in the concluding portion of the specification. The invention, however, both as to organization and method of operation may best be understood by reference to the following description taken in connection with the accompanying drawings, in which:

DATA PROCESSING SYSTEM—GENERAL

Figure 1:
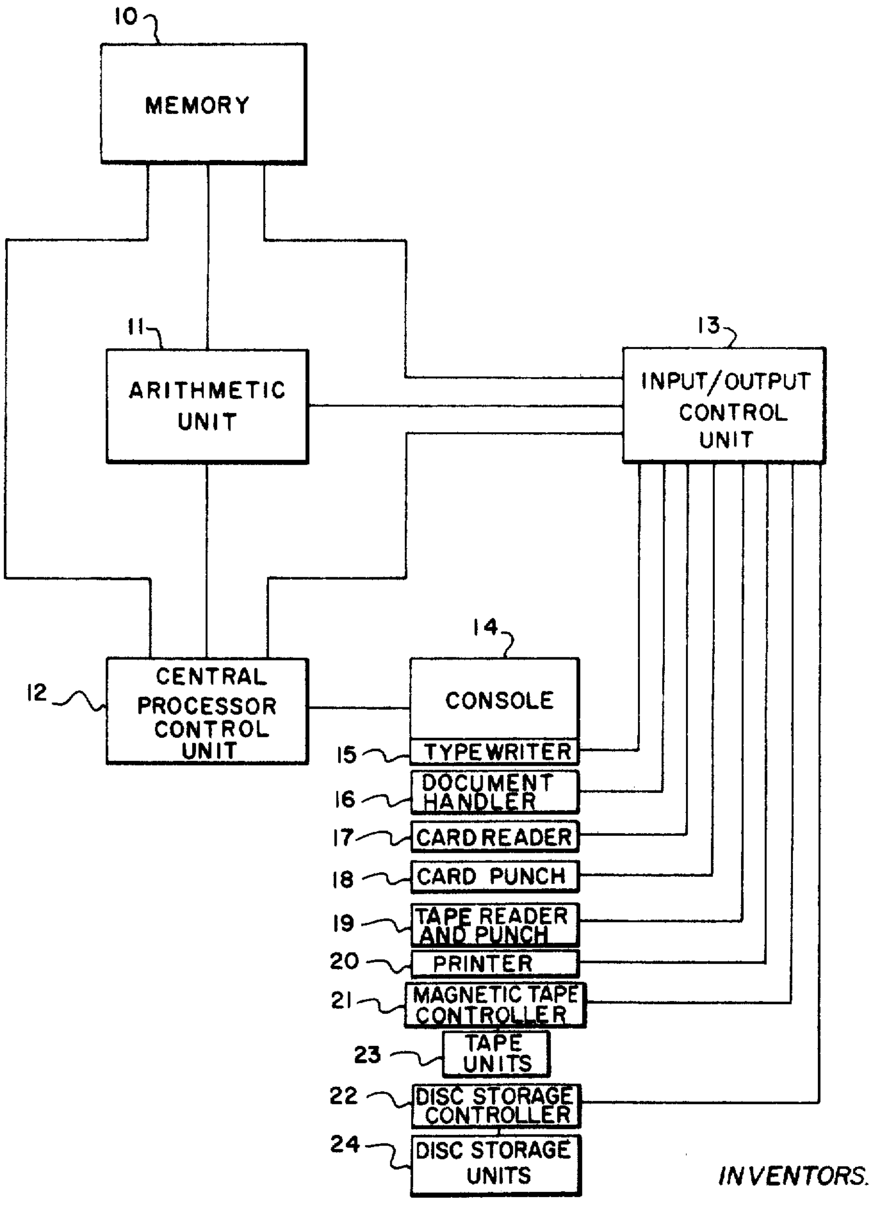
FIGURE 1 is a block diagram of the data processing system to which the instant invention is applicable.

With reference to FIG. 1, the illustrated data processing system comprises a Central Processor and a plurality of peripheral subsystems. The major units of the Central Processor are Memory 10, Arithmetic Unit 11, Central Processor Control Unit 12, Input/Output Control Unit 13 and Console 14. In the description, the term Program Processor is applied to the portion of the Central Processor consisting of the Arithmetic Unit 11, the Central Processor Control Unit 12 and the Console 14. The peripheral subsystems which are used with the Central Processor to process data include Typewriter 15 which is associated with Console 14, Document Handler 16, Card Reader 17, Card Punch 18, Perforated Tape Reader/Punch Unit 19, Printer 20, Magnetic Tape Controller 21 and Disc Storage Controller 22. Magnetic Tape Controller 21 can control a plurality of Magnetic Tape Units 23 and Disc Storage Controller 22 can control a plurality of Disc Storage Units 24. Any combination of these peripheral subsystems may be employed with the Central Processor to perform a desired data processing function. The lines interconnecting the various components illustrated in FIG. 1 represent symbolically paths of data and control signals.

The Central Processor responds to a plurality of distinct instructions which are supplied in the sequential order necessary to perform a particular data processing operation. Memory 10 stores data words which are to be processed, data words which are the result of processing, instruction words and auxiliary words for addressing and control. The Accumulator of the Cenrtal Processor is also located in Memory 10.

Arithmetic Unit 11 performs binary and decimal arithmetic operations. Central Processor Control Unit 12 controls the sequence of events required for instruction execution in the Central Processor. Arithmetic Unit 11 and Central Processor Control Unit 12, which together comprise the Program Processor, contain the logical elements necessary to access Memory 10 and to perform all operations required for instruction execution. Arithmetic Unit 11 and Central Processor Control Unit 12 communicate with Memory 10 to obtain instruction words, auxiliary words, data words on which operations are to be performed and control signals for synchronizing the Program Processor timing wiht operations in Memory 10.

Input/Output Control Unit 13 provides for orderly sequencing of data transfers between Memory 10 and the plurality of peripheral subsystems and serves to transmit instructions from the Central Processor to the peripheral subsystems. The Input/Output Control Unit also monitors peripheral subsystem operating conditions. Communication between the Central Processor and the various peripheral subsystems occurs through a plurality of channels which are included in the Input/Output Control Unit 13, each channel being associated with one peripheral subsystem.

Console 14, in conjunction with Typewriter 15, permits operator control and communication with the Central Processor. The Console includes switches for controlling Central Processor power and program loading, for initiating and halting Central Processor operation and for resetting alert conditions.

For a complete description of the system of FIGURE 1 and of the present invention which is embodied in such system, reference is made to United States Patent 3,368,-205, Hunter et al., issued Feb. 6, 1968, and assigned to the assignee of the present invention. More particularly, FIGURES 12 and 24 of the drawings and column 96, lines 26–75, column 97, and column 98, lines 1–57 are incorporated herein by reference and are made a part of the instant patent application.

What is claimed as new and desired to be secured by Letters Patent of the United States is:

1. In a data processing system, a mmeory comprising a plurality of addressable memory storage locations, a relocatable accumulator for storing a plurality of information processing words of determinable significance comprising a plurality of adjacent storage locations in said memory, said words being stored in said storage locations according to the significance of said words and said storage locations, one of the memory storage locations of said accumulator being designated the most-significant accumulator word location, a register for storing the memory address of the most-significant accumulator word location of said accumulator, means for changing the memory address in said register, and means responsive to the memory address to effect a corresponding change in the location of said accumulator in said memory, said means including means for determining the significance of said information processing words.

2. In a data processing system, a memory comprising a plurality of addressable storage locations, a relocatable accumulator comprising a plurality of adjacent storage locations in said memory, the most-significant memory storage location of said accumulator having a memory address which is evenly divisible by four, a first register for storing the memory address of the most-significant memory storage location of said accumulator, a second register, the contents of said first and said second registers comprising the memory address of a given storage location in said accumulator, means for changing the contents of said second register to form in said first and said second registers the memory address of a selected one of the plurality of adjacent storage locations of said accumulator, means for changing the address in said first register, and means to effect a corresponding change in the location of said accumulator in said memory responsive to the change in the address in said first register.

3. In a data processing system, a memory comprising a plurality of addressable storage locations, a relocatable accumulator comprising adjacent storage locations, a first register for storing the memory address of one of said memory storage locations, a second register for storing operation codes of instruction words, processing means responsive to predetermined operation codes in said second register for employing the memory address in said first register to process, during data processing operations corresponding to the predetermined operation codes, the contents of the memory storage location whose memory address is contained in said first register, means for changing the memory address in said first register, and means to effect a corresponding change in the memory location whose contents are processed by said processing means during the data processing operations corresponding to the predetermined operation codes in said register.

4. In a data processing system, a memory comprising a plurality of addressable storage locations, a first register for storing the memory address of one of a plurality of adjacent memory storage locations, said plurality of adjacent memory storage locations comprising a relocatable accumulator in said memory and the memory address in said first register indicating the location of the accumulator in said memory, a second register for storing operation codes of instruction words, processing means responsive to the memory address in said first register and responsive to predetermined operation codes in said second register for employing, during corresponding data processing operations, the contents in parallel of selected ones of said plurality of adjacent memory storage locations comprising the accumulator, means for changing the memory address in said first register, and means to effect a corresponding change in the plurality of adjacent memory storage locations whose contents are employed by said processing means during the data processing operations corresponding to the predetermined operation codes in said register.

5. In a data processing system, a memory comprising a plurality of addressable storage locations, a relocatable accumulator in said memory for storing a plurality of information processing words, said accumulator comprising at least one of said addressable memory storage locations and having a single memory address, a register for storing the memory address of said accumulator, means for changing the memory address in said register, and means to effect a corresponding change in the location of said accumulator to other adjacent storage locations in said memory.

6. In a data processing system, a memory comprising a plurality of addressable storage locations, a relocatable accumulator in said memory for storing a plurality of information processing words, said accumulator comprising selected adjacent memory storage locations and having a single memory address, a register for storing the memory address of words comprising at least one of said selected memory storage locations of said accumulator, means for changing the memory address in said register, and means responsive to the change in the memory address to effect a corresponding change in the location of said accumulator to other adjacent storage locations in said memory.

References Cited

UNITED STATES PATENTS

| | | | |
|---|---|---|---|
| 3,166,668 | 1/1965 | Marsh | 235—157 |
| 3,161,763 | 12/1964 | Glaser | 235—157 |
| 3,160,857 | 12/1964 | Frush | 340—172.5 |
| 3,071,739 | 1/1963 | Runyon | 333—18 |
| 3,026,036 | 3/1962 | Haanstra et al. | 235—157 |
| 3,012,723 | 12/1961 | Goertzel | 235—157 |
| 2,943,788 | 7/1960 | Hearsum et al. | 235—61.9 |
| 2,923,469 | 2/1960 | Woodbury | 235—61.9 |
| 2,902,675 | 9/1959 | Shaw et al. | 340—174 |
| 3,077,580 | 2/1963 | Underwood | 340—172.5 |

OTHER REFERENCES

IBM Reference Manual 1401 Data Processing System, 1960 edition revised October 1960, Patent Office Mail Room stamp date Jan. 15, 1962, pp. 9, 15, 28, 29 and 82.

GARETH D. SHAW, Primary Examiner